United States Patent
Johnson et al.

(10) Patent No.: US 9,114,575 B2
(45) Date of Patent: Aug. 25, 2015

(54) COMPOSITE MATERIAL PLACEMENT METHOD AND SYSTEM

(75) Inventors: Brice A. Johnson, Federal Way, WA (US); David J. Carbery, Vashon, WA (US)

(73) Assignee: THE BOEING COMPANY, Chicago, IL (US)

( * ) Notice: Subject to any disclaimer, the term of this patent is extended or adjusted under 35 U.S.C. 154(b) by 834 days.

(21) Appl. No.: 12/961,066

(22) Filed: Dec. 6, 2010

(65) Prior Publication Data

US 2011/0073238 A1    Mar. 31, 2011

Related U.S. Application Data

(62) Division of application No. 11/352,274, filed on Feb. 13, 2006, now Pat. No. 7,867,352.

(51) Int. Cl.
| | |
|---|---|
| *B29C 65/50* | (2006.01) |
| *B29C 70/38* | (2006.01) |
| *B29C 70/32* | (2006.01) |
| *B29C 70/54* | (2006.01) |

(52) U.S. Cl.
CPC .............. *B29C 70/386* (2013.01); *B29C 70/32* (2013.01); *B29C 70/545* (2013.01); *Y10T 156/10* (2015.01); *Y10T 156/1052* (2015.01); *Y10T 156/1062* (2015.01); *Y10T 156/1077* (2015.01); *Y10T 156/17* (2015.01)

(58) Field of Classification Search
USPC .............. 156/250, 304.1, 258, 187, 299, 300, 156/285
See application file for complete search history.

(56) References Cited

U.S. PATENT DOCUMENTS

| | | | |
|---|---|---|---|
| 4,867,833 | A | 9/1989 | McCoy |
| 5,562,788 | A | 10/1996 | Kitson et al. |
| 6,860,957 | B2 | 3/2005 | Sana et al. |
| 7,137,182 | B2 | 11/2006 | Nelson |
| 7,282,107 | B2 | 10/2007 | Johnson et al. |
| 2004/0026025 | A1 | 2/2004 | Sana et al. |
| 2004/0098852 | A1 * | 5/2004 | Nelson ............................ 29/428 |
| 2005/0039843 | A1 | 2/2005 | Johnson et al. |

(Continued)

FOREIGN PATENT DOCUMENTS

| | | |
|---|---|---|
| DE | 331494 A1 | 3/1985 |
| EP | 1422048 A2 | 5/2004 |

(Continued)

OTHER PUBLICATIONS

Favaloro et al., "Process and Design Consideration for the Automated Fiber Placement Process", Automated Dynamics Company—Technical Papers, presented at SAMPE Fall Technical Conference, Oct. 29, 2007, 11 pages. http://www.automateddynamics.com/tech_papers_final_php>, last visited Oct. 1, 2009.

*Primary Examiner* — Jacob T Minskey
*Assistant Examiner* — Vishal I Patel
(74) *Attorney, Agent, or Firm* — Yee & Associates, P.C.

(57) ABSTRACT

To apply a course on a layup mold, a ply boundary that defines a ply area on the layup mold is determined and a tape of composite material is applied on the ply area at an oblique angle relative to the ply boundary. In addition, a leading edge of the tape is butt cut and the leading edge, and the ply boundary essentially converge. Furthermore, a trailing edge is generated. The trailing edge is a butt cut and the trailing edge and the ply boundary essentially converge.

20 Claims, 6 Drawing Sheets

(56) References Cited

U.S. PATENT DOCUMENTS

2005/0240291 A1* 10/2005 Oldani et al. .................. 700/57
2006/0090856 A1   5/2006 Nelson et al.
2006/0118244 A1*  6/2006 Zaballos et al. ............. 156/510

FOREIGN PATENT DOCUMENTS

GB           1314065       4/1973
WO        2005106604 A2   11/2005

* cited by examiner

COMPOSITE MATERIAL PLACEMENT METHOD AND SYSTEM

CROSS-REFERENCE TO RELATED APPLICATIONS

This application is a divisional of and claims priority to U.S. application Ser. No. 11/352,274 filed on Feb. 13, 2006 and entitled COMPOSITE MATERIAL PLACEMENT METHOD AND SYSTEM, the entire contents of which is expressly incorporated herein by reference.

BACKGROUND INFORMATION

1. Field

The present invention generally relates to a system and method of fabricating a composite item. More particularly, the present invention pertains to a system for auto lamination of a composite and its method of use.

2. Background

Composite items are typically fabricated from multiple layers or plies. These plies generally include a variety of materials such as carbon fiber, various other fibers, metal films or foils, and the like. In addition, the plies may be pre-impregnated (if fiber) or coated (if foil) with a resin and are often dispensed from a roll or spool. In roll form, the composite ply material is referred to as "tape" and may or may not include a backing layer. This backing generally prevents resin coated or pre-impregnated ply material (prepreg) from adhering to itself and aids in handling the tape as the tape is applied to the tool and the layup. The tape is applied to tool in a multitude of courses laid side by side to form a ply. The wider this tape is, the fewer the number of courses that need be applied. As such, using wider tape generally increases lay-down rates and speeds fabrication of the composite item. However, increasing the width of the tape increases the size and complexity of the tape cutting device.

In conventional lamination machines, the tape is cut at the beginning and end of each ply to match the profile of the ply being laid. Generally, the starting profile of a course does not match the end profile of the previously applied course. Therefore, conventional lamination machines are required to move away from the tool or mandrel to cut a new profile that matches the beginning of the next course. This procedure wastes time and composite material. In addition, cutting devices are the least reliable component of conventional laminating machines.

Accordingly, it is desirable to provide a method and system for fabricating composite items that is capable of overcoming the disadvantages described herein at least to some extent.

SUMMARY

The foregoing needs are met, to a great extent, by the present invention, wherein in some advantageous embodiments a system for fabricating laminated composite items and a method of using such a system is provided.

An advantageous embodiment of the present invention relates to a method of applying a course on a layup mold. In this method, a ply boundary that defines a ply area on the layup mold is determined and a tape of composite material is applied on the ply area at an oblique angle relative to the ply boundary. In addition, a leading edge of the tape is butt cut and the leading edge and the ply boundary essentially converge. Furthermore, a trailing edge is generated. The trailing edge is a butt cut and the trailing edge and the ply boundary essentially converge.

Another advantageous embodiment of the present invention pertains to a method of fabricating a transition zone in a composite item. The transition zone defines an area that begins at a first skin gauge and ends at a second skin gauge. The transition zone includes a first oblique ply boundary that is offset from a second oblique ply boundary. In this method, a first set of tapes of composite material is applied across the first oblique ply boundary. Each of the first set of tapes includes a respective end that is butt cut and each of the first set of tapes includes a respective centerline. For each of the first set of tapes, the respective end and the respective centerline essentially converge upon the first oblique ply boundary. In addition, a second set of tapes of composite material is applied across the second oblique ply boundary. Each of the second set of tapes includes a respective end that is butt cut and each of the second set of tapes includes a respective centerline. For each of the second set of tapes, the respective end and the respective centerline essentially converge upon the second oblique ply boundary. The respective ends of the second set of tapes are offset from the respective ends of the first set of tapes to generate a crenulated pattern.

Yet another advantageous embodiment of the present invention relates to a computer readable medium on which is embedded computer software comprising a set of instructions for executing a method of applying a course on a layup mold. In this method, a ply boundary that defines a ply area on the layup mold is determined and a tape of composite material is applied on the ply area at an oblique angle relative to the ply boundary. In addition, a leading edge of the tape is butt cut and the leading edge and the ply boundary essentially converge. Furthermore, a trailing edge is generated. The trailing edge is a butt cut and the trailing edge and the ply boundary essentially converge.

Yet another advantageous embodiment of the present invention pertains to a computer readable medium on which is embedded computer software comprising a set of instructions for executing a method of fabricating a transition zone in a composite item. The transition zone defines an area that begins at a first skin gauge and ends at a second skin gauge. The transition zone includes a first oblique ply boundary that is offset from a second oblique ply boundary. In this method, a first set of tapes of composite material is applied across the first oblique ply boundary. Each of the first set of tapes includes a respective end that is butt cut and each of the first set of tapes includes a respective centerline. For each of the first set of tapes, the respective end and the respective centerline essentially converge upon the first oblique ply boundary. In addition, a second set of tapes of composite material is applied across the second oblique ply boundary. Each of the second set of tapes includes a respective end that is butt cut and each of the second set of tapes includes a respective centerline. For each of the second set of tapes, the respective end and the respective centerline essentially converge upon the second oblique ply boundary. The respective ends of the second set of tapes are offset from the respective ends of the first set of tapes to generate a crenulated pattern.

Yet another advantageous embodiment of the present invention relates to an apparatus for applying a course on a layup mold. The apparatus includes a means for determining a ply boundary that defines a ply area on the layup mold and a means for applying a tape of composite material on the ply area at an oblique angle relative to the ply boundary. A leading edge of the tape is butt cut and the leading edge and the ply boundary essentially converge. In addition, the apparatus includes a means for generating a trailing edge. The trailing edge is a butt cut and the trailing edge and the ply boundary essentially converge.

Yet another advantageous embodiment of the present invention pertains to an apparatus for fabricating a transition zone in a composite item. The transition zone defines an area that begins at a first skin gauge and ends at a second skin gauge. The transition zone includes a first oblique ply boundary that is offset from a second oblique ply boundary. The apparatus includes a means for applying a first set of tapes of composite material across the first oblique ply boundary. Each of the first set of tapes includes a respective end that is butt cut and each of the first set of tapes includes a respective centerline. For each of the first set of tapes, the respective end and the respective centerline essentially converge upon the first oblique ply boundary. In addition, the apparatus includes a means for applying a second set of tapes of composite material across the second oblique ply boundary. Each of the second set of tapes includes a respective end that is butt cut and each of the second set of tapes includes a respective centerline. For each of the second set of tapes, the respective end and the respective centerline essentially converge upon the second oblique ply boundary. The respective ends of the second set of tapes are offset from the respective ends of the first set of tapes to generate a crenulated pattern.

There has thus been outlined, rather broadly, certain advantageous embodiments of the invention in order that the detailed description thereof herein may be better understood, and in order that the present contribution to the art may be better appreciated. There are, of course, additional advantageous embodiments of the invention that will be described below and which will form the subject matter of the claims appended hereto.

In this respect, before explaining at least one advantageous embodiment of the invention in detail, it is to be understood that the invention is not limited in its application to the details of construction and to the arrangements of the components set forth in the following description or illustrated in the drawings. The invention is capable of advantageous embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides, in some advantageous embodiments, a system for placing plies to fabricate a composite item and a method of using this system. In various advantageous embodiments, the system includes an automated lamination device such as, for example, an automated fiber placement (AFP) machine, flat tape lamination machine (FTLM), numerically controlled (NC) contoured tape lamination machine (CTLM), multi-head tape lamination machine (MHTLM), and the like. This lamination device includes one or more dispensing heads to place plies of composite material upon a mandrel, layup mold or tool. In addition, the lamination device includes a cutting device to cut the composite material.

Figure 1:
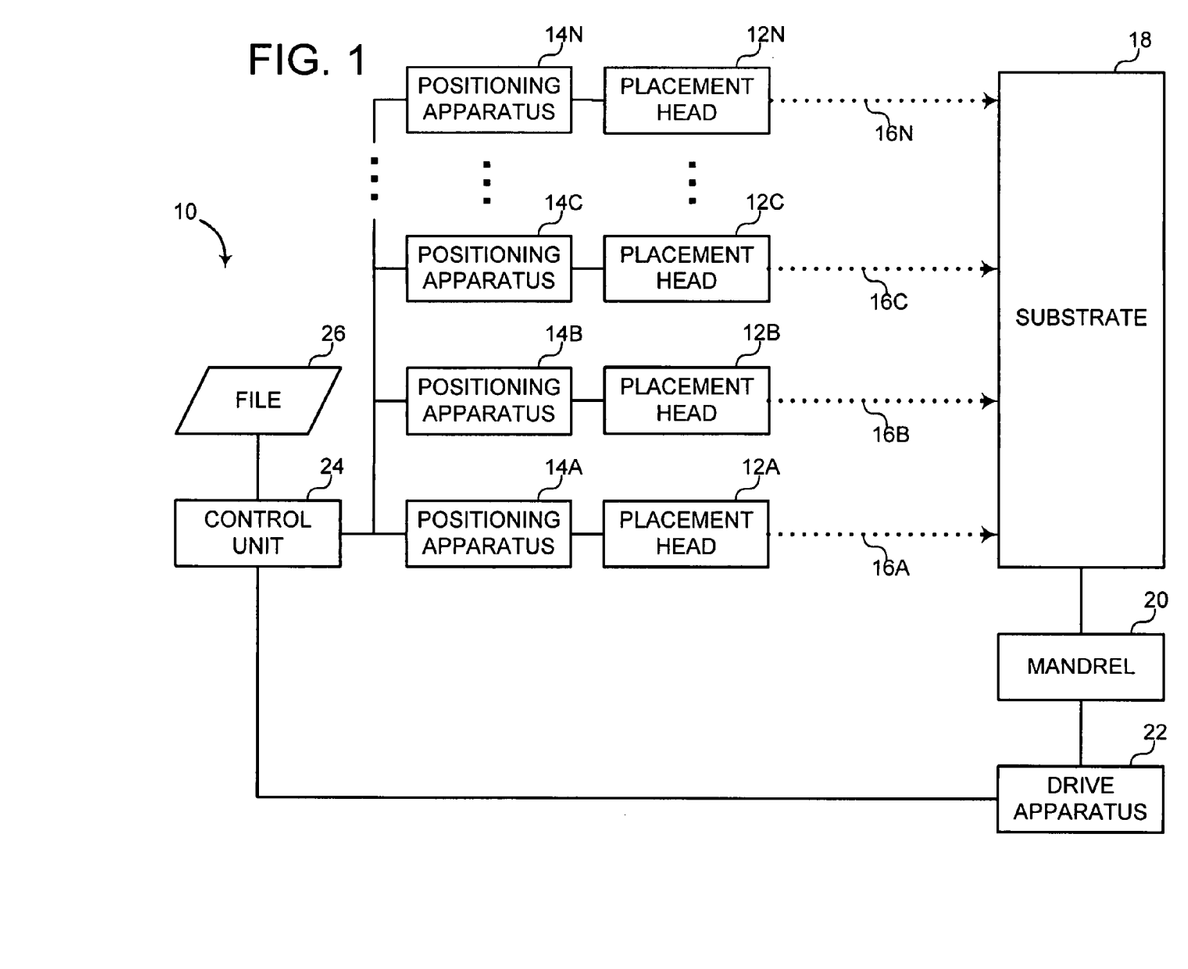
FIG. 1 is a block diagram of a tape lamination machine suitable for use with an advantageous embodiment of the invention.

The invention will now be described with reference to the drawing figures, in which like reference numerals refer to like parts throughout. FIG. 1 is a block diagram of a multi-head tape lamination machine (MHTLM) 10 according to an advantageous embodiment of the invention. As shown in FIG. 1, the MHTLM 10 includes a set of placement heads $12a$-$12n$ that are positioned by a respective set of positioning devices $14a$-$14n$. The placement heads $12a$-$12n$ are configured to place $16a$-$16n$ composite material upon a substrate 18. The substrate 18 includes the surface of a mandrel 20 or other such form and/or tool. In addition, the substrate 18 includes any previously applied composite material, tackifier, and the like that is on the mandrel 20. The mandrel 20 is rotated or otherwise positioned by a drive apparatus 22. The drive apparatus 22 and/or the positioning devices $14a$-$14n$ are controlled by a control unit 24. The control unit 24 accesses a file 26 that includes computer readable instructions for fabricating a composite item.

Figure 2:
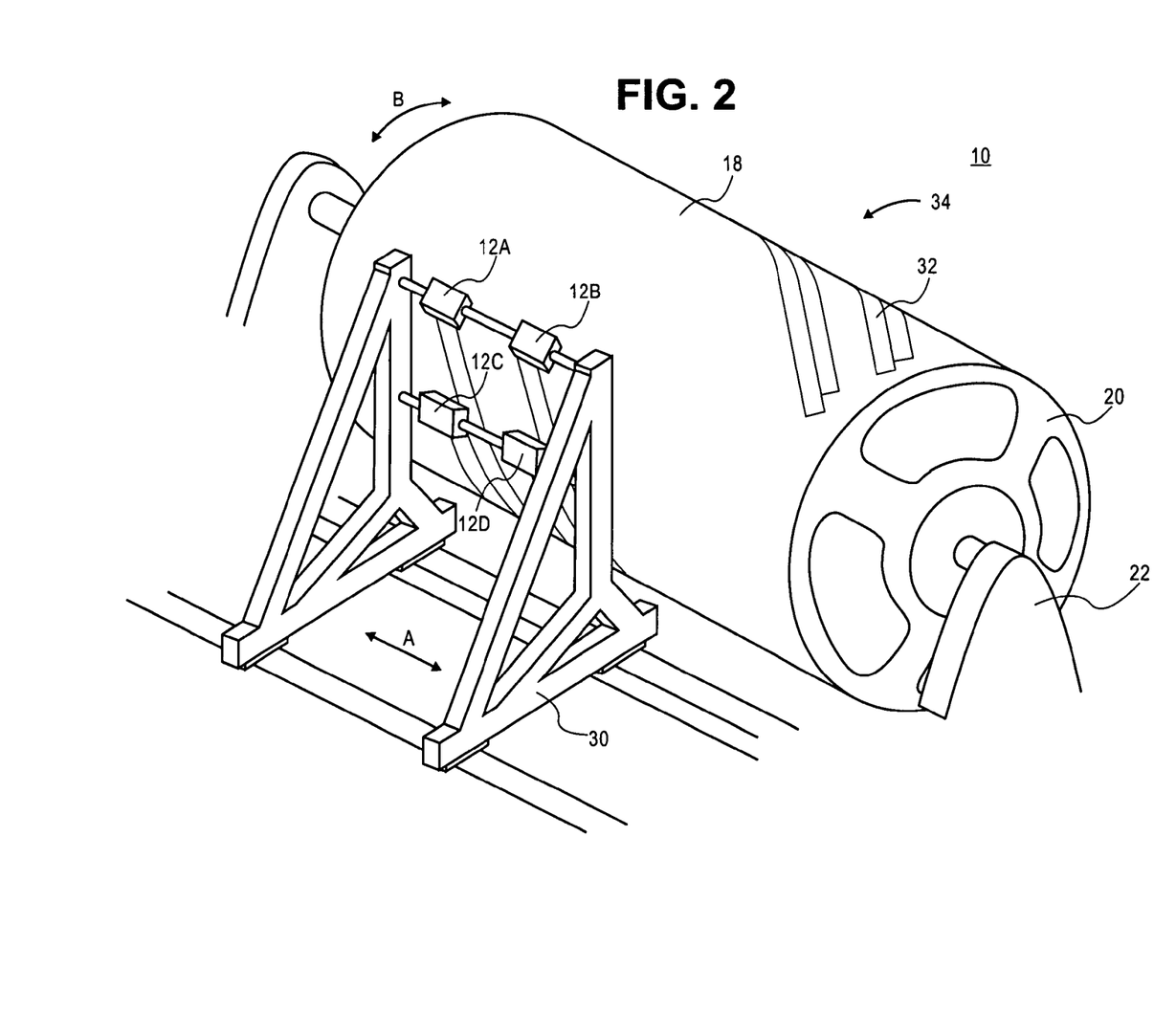
FIG. 2 is a perspective view of a tape lamination machine suitable for use with an advantageous embodiment of the invention.

FIG. 2 is a perspective view of a multi-head tape lamination machine (MHTLM) 10 according to an advantageous embodiment of the invention. As shown in FIG. 2, the MHTLM 10 includes a frame 30 to position the placement heads $12a$-$12d$ relative to the substrate 18. The frame 30 and substrate 18 are configured to move in directions A and B relative to one another. In addition, each of the placement heads $12a$-$12d$ may independently enjoy one or more axes of freedom relative to one another and/or the frame 30. For example, each placement head $12a$-$12d$ may independently move about 5, 6, or the like axes. In this manner, some or all of the placements heads $12a$-$12d$ are configured to place respective strips of a tape 32 upon the substrate 18. The tape 32 includes any suitable material to fabricate a composite item 34. Examples of suitable materials include metal foils, films, fibers, and the like. These materials may be coated or impregnated with resin. In a particular example, the tape 32 includes carbon fibers that are pre-impregnated with a thermoset resin (pre-preg). In another example, the tape 32 includes a titanium foil that is coated with a resin. The composite item 34 includes any suitable item or part that may be fabricated with the tape 32. Particular examples include wing and fuselage components for an aircraft.

Figure 3:
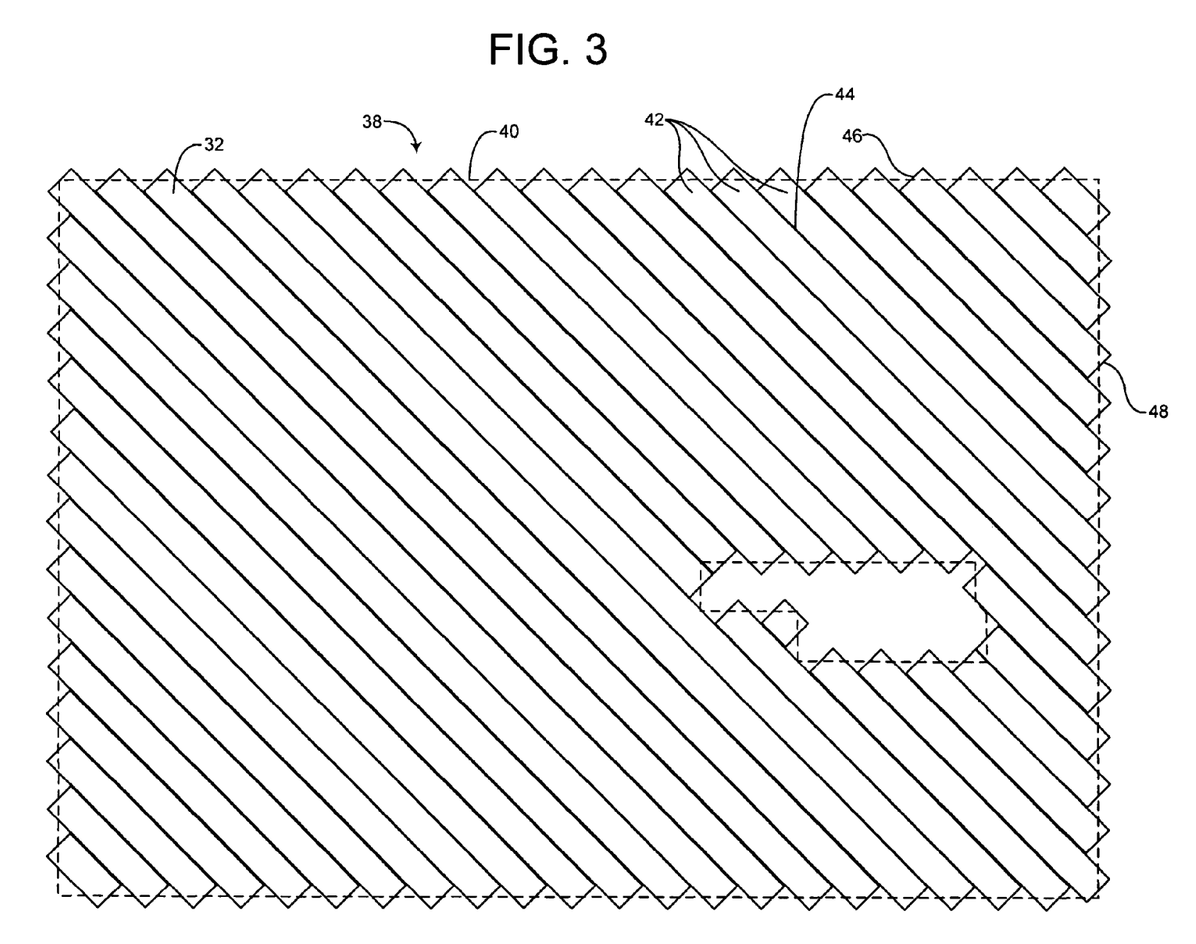
FIG. 3 is a diagram of a ply suitable for use with the advantageous embodiment of the invention illustrated in FIG. 1.

FIG. 3 is a diagram of a ply 38 suitable for use with the advantageous embodiment of the invention illustrated in FIG. 1. As shown in FIG. 3, the ply 38 includes a ply boundary 40 that defines the edges of the ply 38. Of note, the ply 38 includes a plurality of courses 42 that are oriented at about 45° relative to the lines of the ply boundary 40. The ply 38 further includes a plurality of course interfaces 44 disposed between adjacent courses 42. The courses 42 generally include a leading edge 46 and a trailing edge 48. While a 45° is illustrated in FIG. 3, the courses 42 may be oriented at any suitable angle relative to the ply 38 or substrate 18. For example the courses 42 may be oriented at 0°, 90°, +/−45° and the like. When oriented at 0° and 90°, the leading edge 46 and trailing edge 48 of the tape 32 may be positioned to essentially coincide with the ply boundary 40. As such, course orientation of 0° and 90° are relatively straightforward, and thus, will not be discussed further herein. In an advantageous embodiment, at any oblique angle or orientations other than 0° and 90°, some portion of one or both of the leading edge 46 and trailing edge 48 may extend beyond the ply boundary 40 as shown in FIG. 3.

Figure 4:
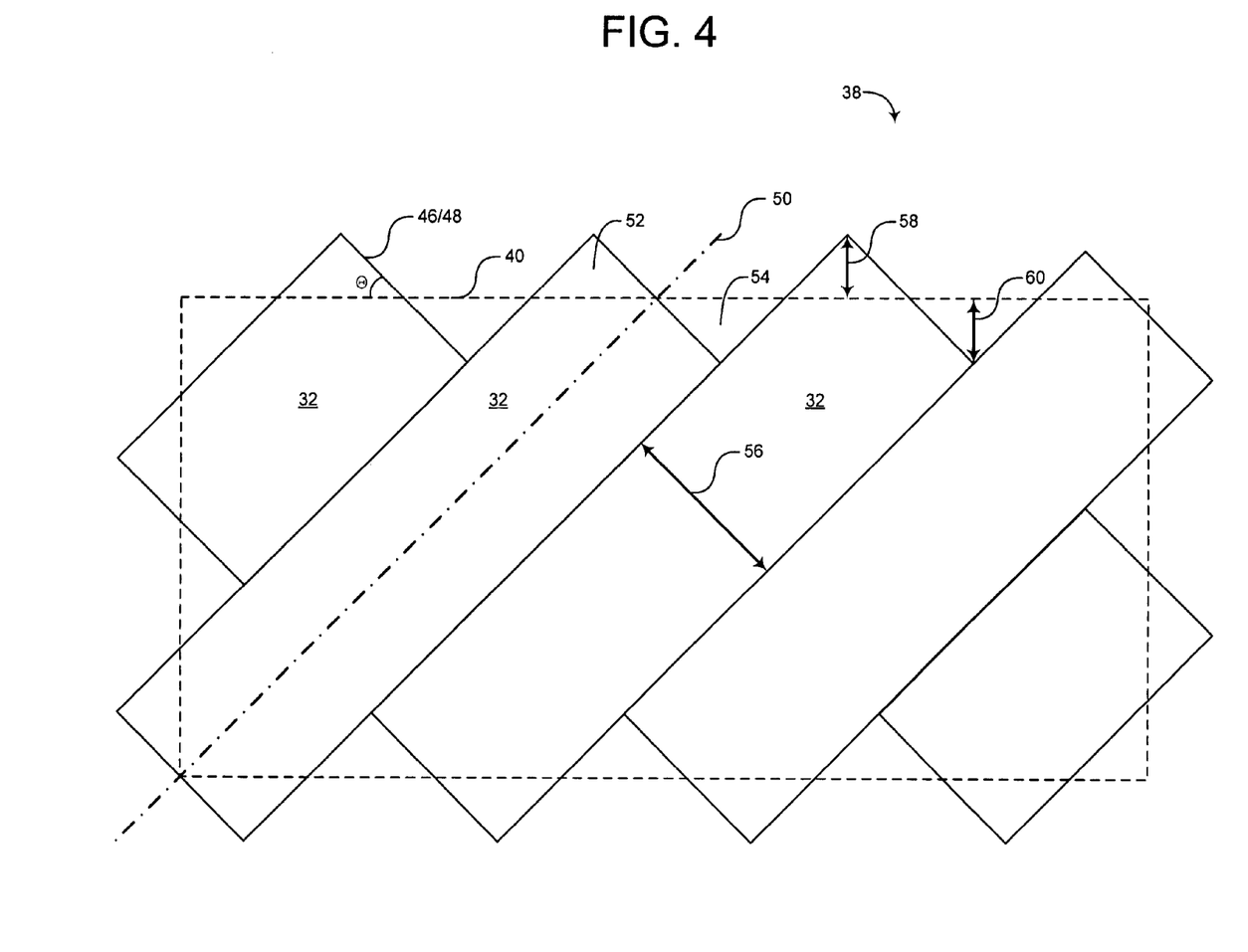
FIG. 4 is a detailed view of a ply suitable for use with the advantageous embodiment of the invention illustrated in FIG. 1.

FIG. 4 is a detailed view of the ply 38 suitable for use with the advantageous embodiment of the invention illustrated in FIG. 1. As shown in FIG. 4, the tape 32 includes a center line 50. In an advantageous embodiment, the tape 32 is positioned upon the ply 38 such that the center line 50, the ply boundary 40, and the leading edge 46 or trailing edge 48 essentially converge or intersect. As such, a portion or a corner of the tape 32 extends to either side of the ply boundary 40 resulting in an overfill 52 and an underfill 54. In a particular example in which the tape 32 is applied at a 45° to the ply boundary 40, the tape 32 includes a width (W) 56 and the overfill 52 includes a height (h) 58 that may be described by the equation:

$$h = \frac{W}{2\sqrt{2}} \quad \text{Eqn. 1}$$

Utilizing the above Eqn. 1, given the width 56 of 3 inches (7.62 cm), the height 58 is approximately equal to 1.06 inches (2.69 cm). Similarly, a height 60 of the underfill 54 is essentially equal to the height 58. More generally, for any oblique angle, the heights 58 and 60 may be described by the equation:

$$h = \frac{W(\text{SIN}\theta)}{n} \quad \text{Eqn. 2}$$

Where Θ is an angle of incidence (in Radians) between the ply boundary 40 and the leading or trailing edge 46/48 and where n≥1. In this regard, depending upon the tape cutting mechanism of the placement head 12a-12n, the leading and trailing edges 46 and 48 may be cut at about 80° to about 100° relative to the center line 50. More particularly, the leading and trailing edges 46 and 48 may be cut at about 85° to about 95° relative to the center line 50. This variance from 90° is related to the design of the cutting assembly and the speed that the tape 32 is moving as the cut is taking place. In addition, with regard to n being greater than or equal to 1, the leading and/or trailing edges 46/48 may be disposed any suitable location along the ply boundary 40. Depending upon the particular application, n may be set to a specific value. However, in other applications, n (i.e., the amount the leading/trailing edges 46/48 overlap the ply boundary 40) may vary from ply to ply or even within a given ply. In a particular example, n=2 which results in an overlap of about 50%. In this example, the leading/trailing edges 46/48, ply boundary 40, and center line 50 all essentially converge.

Figure 5:
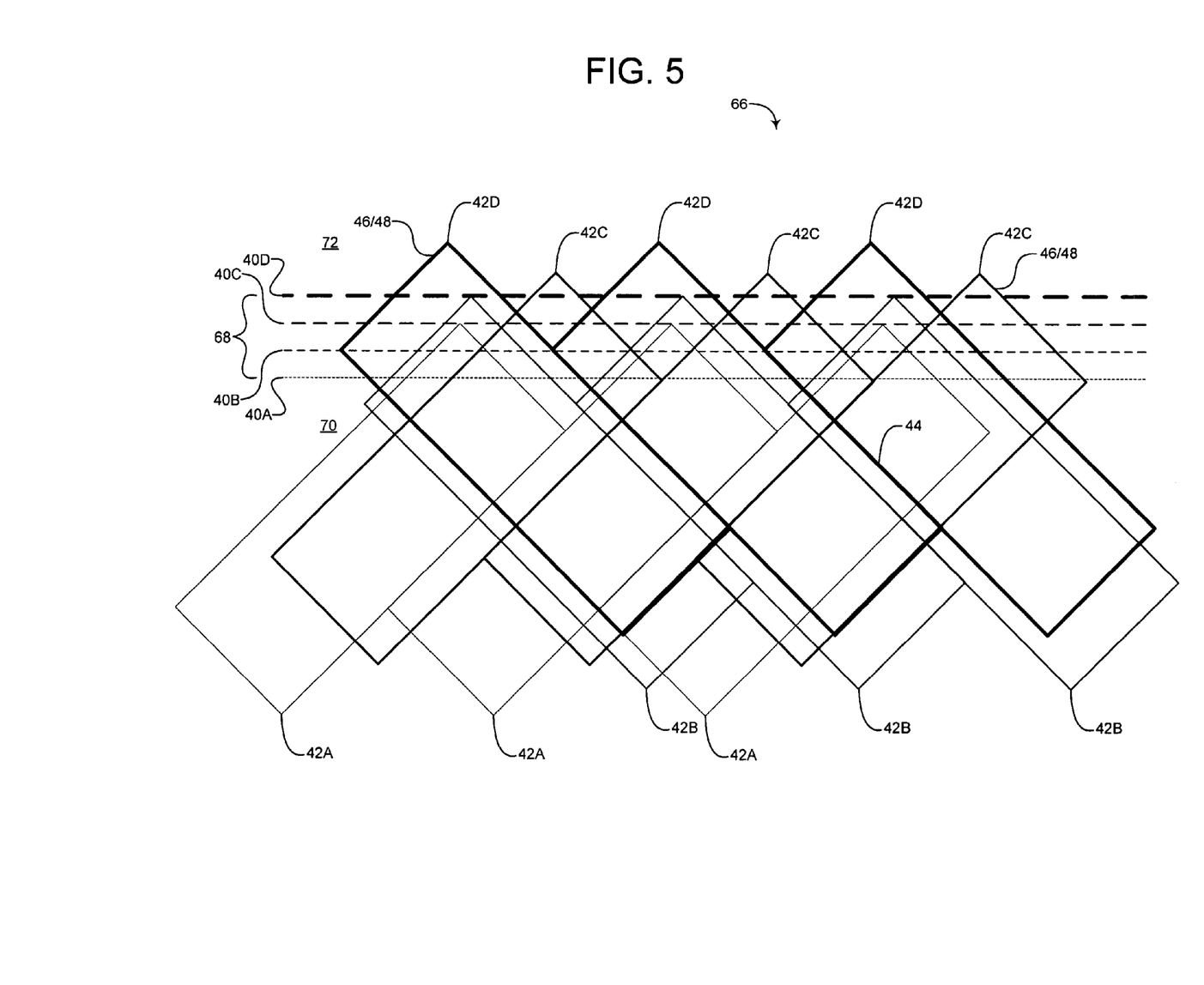
FIG. 5 is a diagram of ply placement schema suitable for use with the advantageous embodiment of the invention illustrated in FIG. 1.

FIG. 5 is a diagram of a ply placement schema 66 suitable for use with the advantageous embodiment of the invention illustrated in FIG. 1. The ply placement schema 66 may be utilized to place a plurality of plies 38a-38n along a transition zone 68. The transition zone 68 defines an interface between a first area 70 of the composite item 34 having a first thickness or "skin gauge" and a second area 72 of the composite item 34 having a second skin gauge. Differences in the skin gauges between the first area 70 and the second area 72 are accomplished by altering the number of the plies 38a-38n. That is, to generate a relatively stronger or thicker area on the composite item 34, a relatively greater number of the plies 38a-38n are applied to the substrate 18. The plies 38a-38n include respective ply boundaries 40a-40n that are spaced across the transition zone 68. In addition, the plies 38a-38n are staggered as shown in FIG. 5 such that the leading and trailing edges 46/48 and/or the interfaces 44 do not coincide. This crenulation or spacing and staggering eases or smoothes the transition zone 68. In this manner, transitions that are structurally sound, cosmetically appealing, and/or aerodynamically favorable may be generated quickly and efficiently.

In applications where the ply boundary 40 is outside of net trim (e.g., outside of an area that will be cut off in subsequent processing), there is no issue with one ply 38 interacting with the other plies 38 in the composite item 34. However, in the transition zone 68 or other ply ramp regions, where many plies 38 are terminated within a short distance, the interactions of crenulations through the thickness of the composite item 34 are relatively more important. Ply ramps typically occur in fuselage structures at a 20:1 ratio. Thus, given a ply thickness of 0.0074 inches (0.188 mm), the ply boundaries 40a-40n may be positioned 0.0074*20=0.148 inches (3.76 mm) apart.

In a particular advantageous embodiment shown in FIG. 5, the transition zone 68 includes four +/−45° plies 38a-38d (two +45° and two −45°). For the sake of clarity, 0° and/or 90° plies that may be placed within the transition zone 68 have not been shown. However, typical ply orientation sequence from ply to ply is 45°/90°/−45°/0°. If present, these or other plies placed in between the plies 38a-38d may have respective ply boundaries that fall between the ply boundaries 40a-40d. In a particular example, if a 0° ply is disposed between the plies 38a and 38b, the 0° ply may include a ply boundary disposed about ½ of the distance between ply boundary 40a and 40b. If a 90° ply is disposed between the plies 38b and 38c, the 90° ply may include a ply boundary about ½ of the distance between ply boundary 40b and 40c. The spacing of the ply boundaries 40a-40n is determined by the ply ramp ratio. Typical ramp ratios for aerospace applications include about a 20:1 or the like. However, various advantageous embodiments of the invention include any suitable ramp ratio.

It is a benefit of advantageous embodiments of the present invention that head complexity may be reduced due to the relatively simplified cuts as compared to conventional tape placement devices. The simplification of the cuts results in increased head reliability and the ability to utilize multiple heads on a single machine to dramatically increase productivity of composite lay-up machines. In contrast, deliver heads of conventional tape placement machines are not reliable enough to use multiple heads at a single time.

It is an additional benefit of various advantageous embodiments that relatively wider tapes may be utilized. When compared to tape utilized by conventional fiber placement machines, the use of relatively wider tapes results in more robust mechanisms, improved head reliability, and increased total width of material capable of being placed by a single machine, resulting in dramatic improvements in machine productivity and reliability.

It is yet another benefit of various advantageous embodiments that the leading and trailing ends 46/48 are essentially the same. In conventional ply placement devices, after cutting the trailing end to exactly match the ply boundary, the placement head must move outside the placement area to cut a leading edge profile that matches the beginning of the next course. This process in conventional ply placement devices wastes time and materials. Advantageous embodiments of the invention, by virtue of having the leading and trailing edges 46/48 being essentially the same, omit this time consuming operation and do not waste these expensive materials.

It is yet another benefit of various advantageous embodiments of the present invention that existing composite items may be fabricated in accordance with advantageous embodiments of the invention with little or no modification to the existing fabrication instructions. In particular, parts fabricated with inner mold line ("IML") tooling and/or semi rigid outer mold line ("OML") tooling or caul sheets such as used on 787 fuselage components, may be fabricated according to advantageous embodiments of the invention. The IML tool surface is sculpted to match ply thickness variations so that the OML may remain smooth. In these and other instances, improper location of the composite material may result in OML surface variations beyond acceptable limits. Thus, advantageous embodiments of the invention provide sufficient control of material or ply placement to generate acceptable OML surface and laminate quality when replacing directly the fiber placement process without any substantial changes to ply boundaries designed for conventional fiber placement machines.

Figure 6:
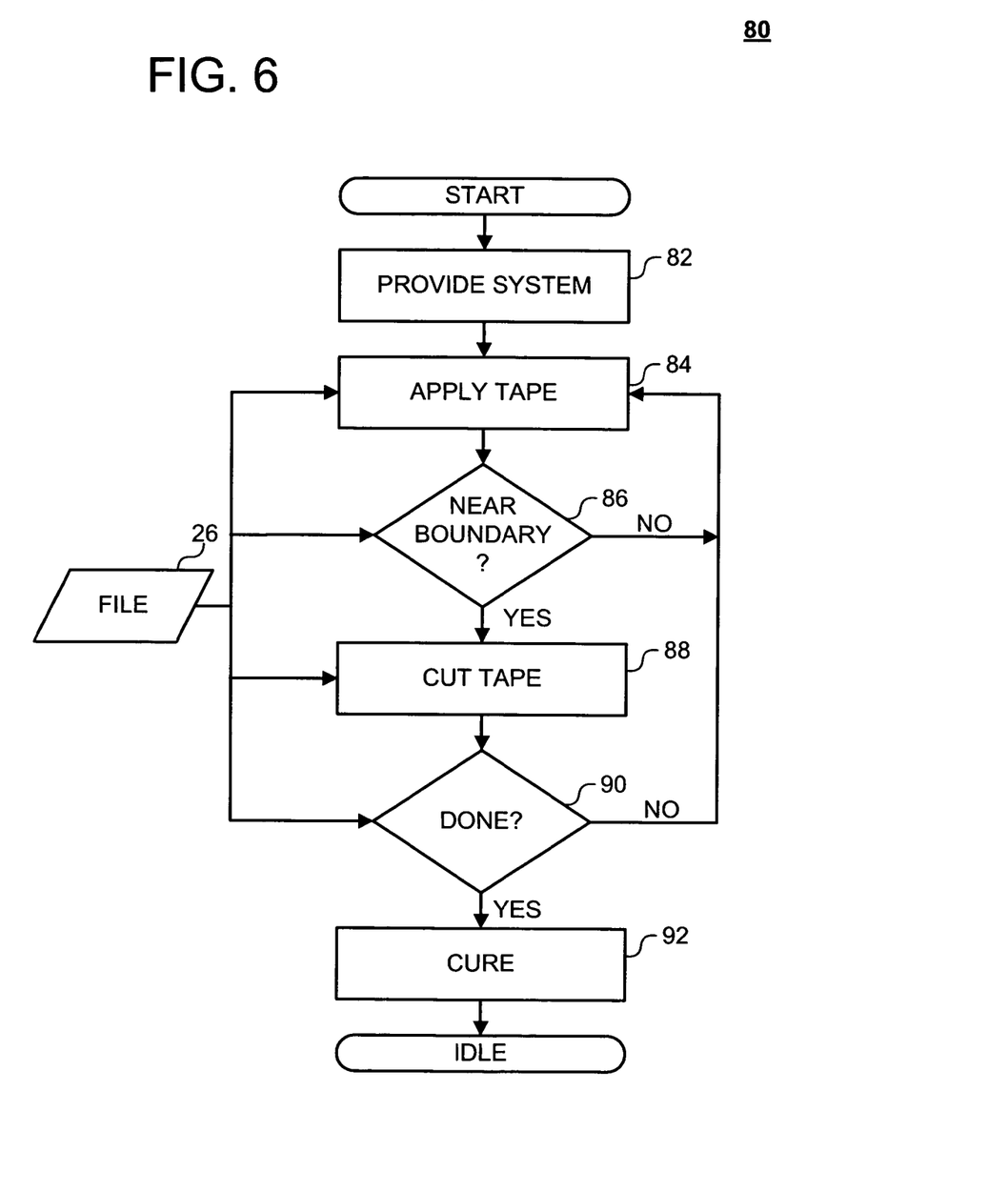
FIG. 6 is a flow diagram for a method of laying tape courses according to an advantageous embodiment of the invention.

FIG. 6 is a flow diagram for a method 80 of laying tape courses according to an advantageous embodiment of the invention. Prior to initiation of the method 60, a variety of preparation may occur. Examples of pre-initiation preparation may include one or more of: design the composite item 34; generate the file 26 corresponding to the composite item 34; generate the mandrel 20 corresponding to the composite item 34; acquire fabrication materials such as the tape 32; and the like. As shown in FIG. 6, the method 80 is initiated in response to providing a system such as the MHTLM 10.

At step 84, the tape 32 is applied to the substrate 20. For example, the file 26 is accessed to determine the ply boundaries 40a-40n. Based upon these ply boundaries 40a-40n, the drive apparatus 22 and/or the positioning apparatus 14a-14n are controlled by the control unit 24 to position the placement heads 12a-12n. Thereafter, the placement heads 12a-12n are controlled to place or apply the tape 32.

At step 86, it is determined whether one or more of the placement heads 12a-12n is approaching an end point or ply boundary 40a-40n. For example, the file 26 is accessed and the current position of the placement heads 12a-12n may be compared to the ply boundaries 40a-40n. In response to it being determined that one or more of the placement heads 12a-12n is approaching an end point or ply boundary 40a-40n, the tape 32 may be cut at step 88. Otherwise, the placement heads 12a-12n may be controlled to continue placing the tape 32 at step 84.

At step 88, the tape 32 is cut. For example, the control unit 24 may control the placement head 12a-12n to cut the tape 32 in response to the approaching ply boundary 40a-40n. In various advantageous embodiments of the invention, the cut is a butt cut. That is, the cut is about perpendicular to the centerline 50 of the tape 32. In an advantageous embodiment, the cut may be timed such that when the tape 32 is placed upon the substrate 18, the cut or trailing edge 48 coincides with the ply boundary 40a-40n.

At step 90, it is determined whether the layup is completed. For example, the file 26 is accessed to determine if there are any further instructions or an end of file ("EOF") identifier is reached. If it is determined that the layup is complete, the composite item 34 may be cured at step 170. If it is determined that the layup is not complete, the tape may be applied at step 84.

At step 92, the composite item 34 is cured. For example, the composite items is placed is a heated and/or pressurized environment to cure the resin in the tape 32.

Following the step 90, the MHTLM 10 may idle or stop until controlled to initiate the method 80 again.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of fabricating a transition zone in a composite item, wherein the transition zone defines an area that begins at a first skin gauge and ends at a second skin gauge, the transition zone includes a first oblique ply boundary that is offset from a second oblique ply boundary, the method comprising:
   applying a first set of tapes of composite material across the first oblique ply boundary, each of the first set of tapes including a respective end that is butt cut and each of the first set of tapes including a respective centerline, wherein for each of the first set of tapes, the respective end and the respective centerline essentially converge upon the first oblique ply boundary; and
   applying a second set of tapes of composite material across the second oblique ply boundary, each of the second set of tapes including a respective end that is butt cut and each of the second set of tapes including a respective centerline, wherein for each of the second set of tapes, the respective end and the respective centerline essentially converge upon the second oblique ply boundary, wherein the respective ends of the second set of tapes are offset from the respective ends of the first set of tapes to generate a crenulated pattern.

2. The method according to claim 1, further comprising:
   applying a third set of tapes of composite material across a 0° ply boundary between the first set of tapes and the second set of tapes, the 0° ply boundary being disposed between the first oblique ply boundary and the second oblique ply boundary.

3. The method according to claim 2, further comprising:
   applying a fourth set of tapes of composite material across a 90° ply boundary between the first set of tapes and the second set of tapes, the 90° ply boundary being disposed between the first oblique ply boundary and the second oblique ply boundary and the 90° ply boundary being offset from the 0° ply boundary, the first oblique ply boundary, and the second oblique ply boundary.

4. The method of claim 1, further comprising:
   prior to applying, performing pre-initiation preparation of the composite item.

5. The method of claim 4, wherein pre-initiation preparation comprises designing the composite item.

6. The method of claim 4, wherein pre-initiation preparation comprises generating a file corresponding to the composite item.

7. The method of claim 4 wherein pre-initiation preparation comprises generating a mandrel corresponding to the composite item.

8. The method of claim 4, wherein pre-initiation preparation comprises acquiring fabrication materials including tape for the composite item.

9. The method of claim 6, further comprising:
accessing the file to determine the first ply boundary and the second ply boundary.

10. The method of 9, wherein applying the first set of tapes and applying the second set of tapes are performed using a plurality of placement heads.

11. The method of claim 10, wherein a control unit controls a drive apparatus to position the placement heads based on the first ply boundary and the second ply boundary.

12. The method of claim 10, further comprising:
determining whether one or more of the plurality of placement heads is approaching an end point or ply boundary.

13. The method of claim 12, further comprising:
responsive to determining that one or more of the plurality of placement heads is approaching the end point or the ply boundary, cutting a corresponding tape.

14. The method of 1, further comprising:
cutting the first set of tapes and cutting the second set of tapes.

15. The method of claim 14, wherein cutting the first set of tapes comprises performing butt cuts and cutting the second set of tapes comprises performing butt cuts.

16. The method of claim 14, further comprising:
timing cutting the first set of tapes and cutting the second set of tapes such that when the first set of tapes and the second set of tapes are placed on a substrate, trailing edges of the first set of tapes and the second set of tapes coincide with the first oblique ply boundary and the second oblique ply boundary, respectively.

17. The method of claim 1, further comprising:
determining whether layup of the first set of tapes and the second set of tapes is complete.

18. The method of claim 17, further comprising:
responsive to determining that the layup is complete, curing the composite item.

19. The method of claim 18, wherein curing comprises:
heating the composite item.

20. The method of claim 19, wherein curing further comprises:
pressurizing the composite item.

* * * * *